United States Patent [19]
Guest et al.

[11] 3,734,666
[45] May 22, 1973

[54] PART REMOVAL APPARATUS

[75] Inventors: Paul R. Guest; Robert F. Kontz, both of Toledo, Ohio

[73] Assignee: Owens-Illinois, Inc., Toledo, Ohio

[22] Filed: Apr. 21, 1971

[21] Appl. No.: 135,926

Related U.S. Application Data

[63] Continuation-in-part of Ser. No. 846,087, July 30, 1969, abandoned.

[52] U.S. Cl. ................. 425/186, 425/388, 425/437
[51] Int. Cl. ............ B29c 7/00, B29c 1/14, B29f 1/14
[58] Field of Search ...................... 425/186, 397, 388, 425/394, 399, 437

[56] References Cited

UNITED STATES PATENTS

| | | | |
|---|---|---|---|
| 3,161,915 | 12/1964 | Thiel | 425/388 |
| 3,240,851 | 3/1966 | Scalora | 425/437 |
| 1,803,300 | 4/1931 | Fahlman | 249/63 |
| 2,253,651 | 8/1941 | Ring | 164/343 |
| 3,081,486 | 3/1963 | Skvorc | 425/247 |
| 3,142,863 | 8/1964 | Mazzoni | 425/437 |

*Primary Examiner*—Robert L. Spicer, Jr.
*Attorney*—J. R. Nelson and E. J. Holler

[57] ABSTRACT

Part removal apparatus for removing and discharging in an oriented position parts formed on machines having reciprocating platens, such as plastic molding machines, for example. Relative movement between the platens of the machine is employed to mechanically drive a part holding element between the separating platens to position a part receiving holder in adjacent position to a freshly formed part which is retained on one of the machine platens. The part is transferred to the holder by the application of vacuum to the holder which then sucks the part into the holder and retains the part on the holder temporarily. The holder is mechanically driven by closing movement of the platens to retract clear of the platens and to thus carry the part into operative alignment with a discharge chute. As the holder arrives in operative alignment with the discharge chute, a pressure source is connected to the holder and to the chute, the application of pressure to the holder blowing the part clear of the holder into the discharge chute, while the application of pressure to the discharge chute blows the freshly received part from the discharge chute into a stationary chute located to be in alignment with the discharge chute at this particular moment.

5 Claims, 7 Drawing Figures

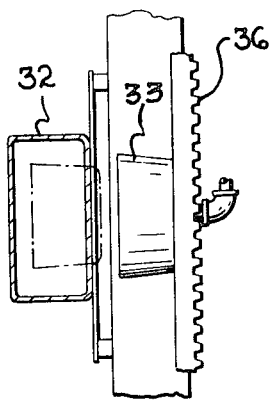
FIG. 4
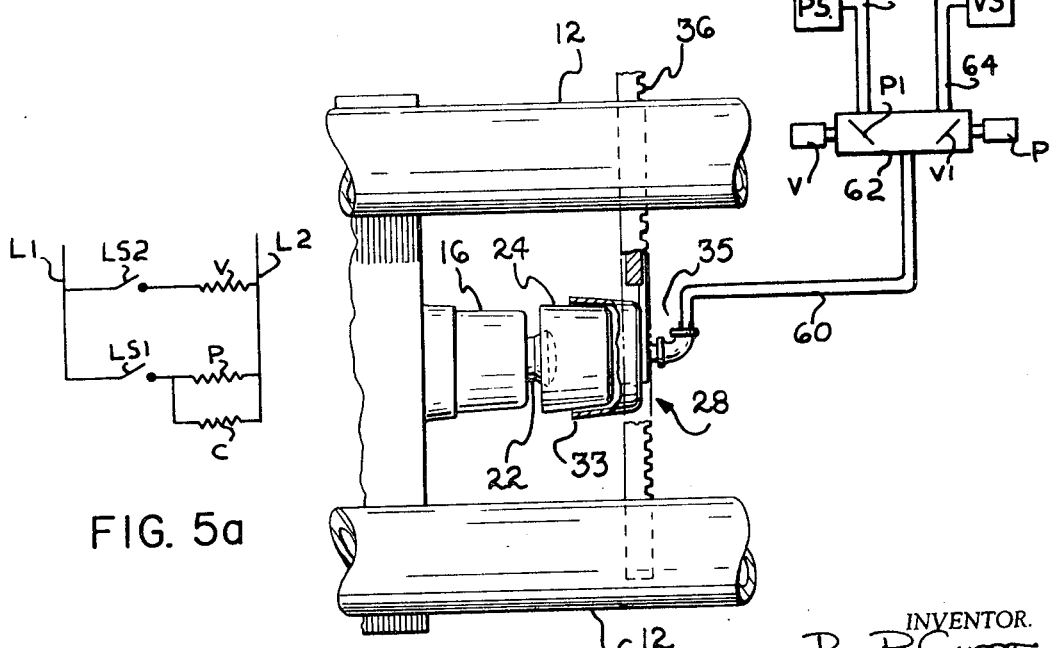
FIG. 5a
FIG. 5

PART REMOVAL APPARATUS

RELATED U.S. APPLICATION

This application is a continuation-in-part of an earlier application, Ser. No. 846,087 filed July 30, 1969, now abandoned.

This invention relates to improvements in part removal apparatus.

The removal of parts from machines, such as molds, presses, forming machines, etc. usually is done mechanically by the use of cams and linkages. These cams and linkages are restricted to relatively low speeds of operation because of their tendency to become mislined as the speed is increased and because of the wear problem which is magnified by all of the multiple-moving linkage and cam connections. Also, these cams and linkages become somewhat complicated when they derive their motion from the machine itself so as to achieve synchronous action.

To overcome these and other problems, novel part removal apparatus is contemplated utilizing simplified structure that is capable of operating at high speeds and which can conveniently and easily be connected to and interlocked with a machine so as to insure proper operation at all times.

The particular machine shown in this application is especially designed for the handling of relatively light weight parts, such as a cup-shaped plastic element. The relatively light weight of the part enables the part to be selectively gripped by or ejected from a cup-shaped part receiving holder by the selective application of vacuum or pressure to the holder.

Other objectives of the invention include the provision of an interlocking arrangement that facilitates servicing of the associated machine as well as the part removal apparatus.

The foregoing and other objects and advantages of the invention will become apparent from the following description and from the accompanying drawings in which:

FIGS. 4 and 5 are enlarged fragmentary views of the part removal apparatus showing a part respectively being ejected and engaged by the apparatus; FIG. 5 includes a schematic diagram of a pressure-vacuum control system;

FIG. 5a is a schematic diagram of an electric control circuit.

Figure 1:
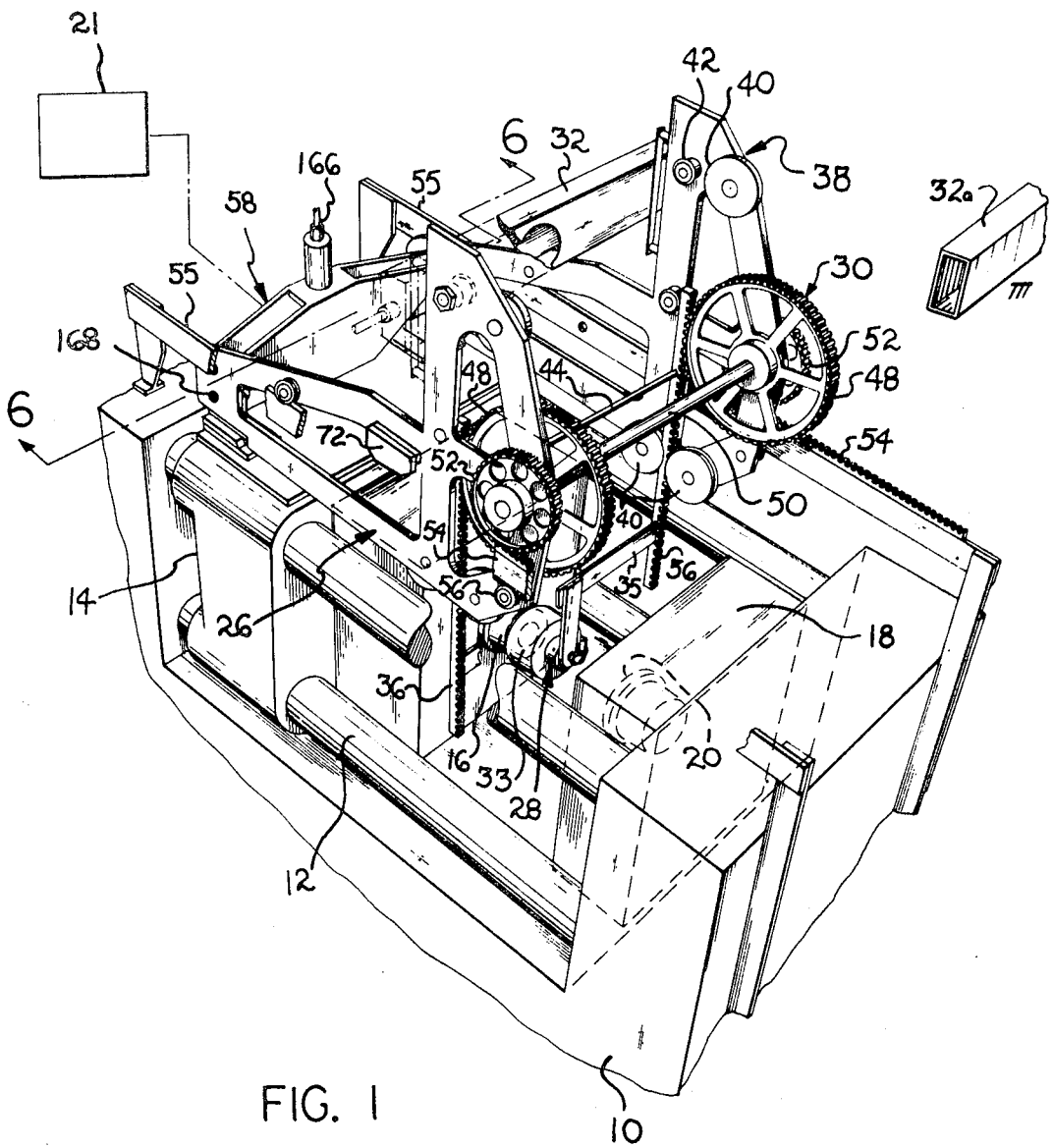
FIG. 1 is a perspective view of a plastic molding machine having installed thereon part removal apparatus incorporating the principles of the invention.

Referring first to FIG. 1, a plastic forming machine is depicted which includes a frame 10 provided with horizontal guideway 12, two on each side. These guideways 12 movably support a platen 14, which incorporates a male mold part 16. A platen 18 is affixed to the frame 10 and includes a female mold part 20 and a suitable power-operated mechanism, such as a motor denoted by the numeral 21, moves the movable platen 14 into engagement with the fixed platen 18 and then in a well known way, a nozzle 22, best viewed in FIG. 5, ejects a plastic material which flows outwardly between the mold parts 16 and 20 to form a cup-shaped part 24. Also as viewed in FIG. 5, this molded cup-shaped part 24 is thereafter removed from the work area between the two platens 14 and 18 (moved apart by the motor 21), by part removal apparatus designated by the numeral 26.

The apparatus 26 includes a part holding device 28 which engages the parts 24 and a rack and gear assembly 30 which maneuvers the device 28 relative to the work area. After its removal from the work area, the part 24 is discharged into a discharge chute 32 which is supplied with air under pressure at appropriate times to blow the part 24 into a stationary receiving chute 32a.

The part holding device 28 as viewed in FIG. 5, includes a cup-shaped holder 33 that embraces the part 24 and may be supplied with vacuum from an appropriate vacuum source VS so as to retain the part 24 within the holder 33 for transportation to the discharge chute 32.

The rack and gear assembly 30 is connected to the cup-shaped holder 33 by a T-shaped arm 35 which is secured to the cup-shaped member 33. The assembly 30 also includes a pair of driven racks 36, which are connected to the opposite ends of the T-shaped arm 35, and a carriage 38 which is mounted on the movable platen 14. These driven racks 36 are movable vertically up and down on carriage 38 so as to move the cup-shaped holder 33 into and out of the work area defined between the platens 14 and 18. As shown in FIG. 1, a series of large and small roller guides 40 and 42 on carriage 38 serve as guideways for these driven racks 36. A cross-bar 44 between the driven racks 36 along with the T-shaped arm 35 insures that the two driven racks 36 move together.

Continuing to refer to FIG. 1, the gear and rack assembly 30 further includes a pair of spaced apart large gears 48, each engaging one of the driven racks 36 and a shaft 50 on which these gears 48 are drive connected. This shaft 50, is, in turn, revolvably supported on the carrier 38. Also, a part of the assembly 30 and attached to this shaft 50 is another pair of spaced apart gears 52 and a pair of fixed drive racks 54. Each of these racks 54 engages one of the gears 52 and is secured to opposite carriage guideways 55 on each side of the frame 10. This back and forth horizontal movement of the carriage 38 with the movable platen 14 will, through the drive connection between the small gears 52 and the drive racks 54, impart rotation to the large gears 48, which then move the driven racks 36 up and down on carriage 38.

Referring now to FIG. 5, there is shown a schematic diagram of a control circuit by means of which the interior of cup 33 is supplied at appropriate times with either vacuum or air under pressure. The interior of cup 33 is connected via a conduit 60 to the outlet port of a three position solenoid actuated valve 62 which is of conventional construction and has thus been illustrated only schematically. In FIG. 5, valve 62 is shown in its centered or neutral position in which the valve closes the adjacent end of conduit 60 and also closes the adjacent end of a vacuum supply conduit 64, connected to a vacuum source VS and also the adjacent end of a pressure supply conduit 66 connected to a pressure source PS. Valve 62 is so constructed that when one of its controlling solenoids P is energized, the valve is shifted to the right from the position shown in FIG. 5 to connect pressure conduit 66 to cup conduit 60 via internal passage P1 of the valve. Alternatively, when the other control solenoid V of valve 62 is energized, the valve member is moved to the left from the position illustrated in FIG. 5 to place vacuum conduit 64 in communication with cup conduit 60 via internal passage V1 of the valve.

Pressure source PS is also connected via a solenoid actuated on-off type valve 68 to a supply conduit 70 which opens into the end of chute 32 to supply an air blast through the chute to blow parts from chute 32. In FIG. 5, valve 68 is in its off position in which communication between pressure conduit 66 and chute conduit 70 is blocked. Upon energization of the solenoid C of chute valve 68, conduits 66 and 70 are interconnected by an internal conduit C1 of valve 68 which is moved into alignment with the two conduits by energization of solenoid C.

Figure 2:
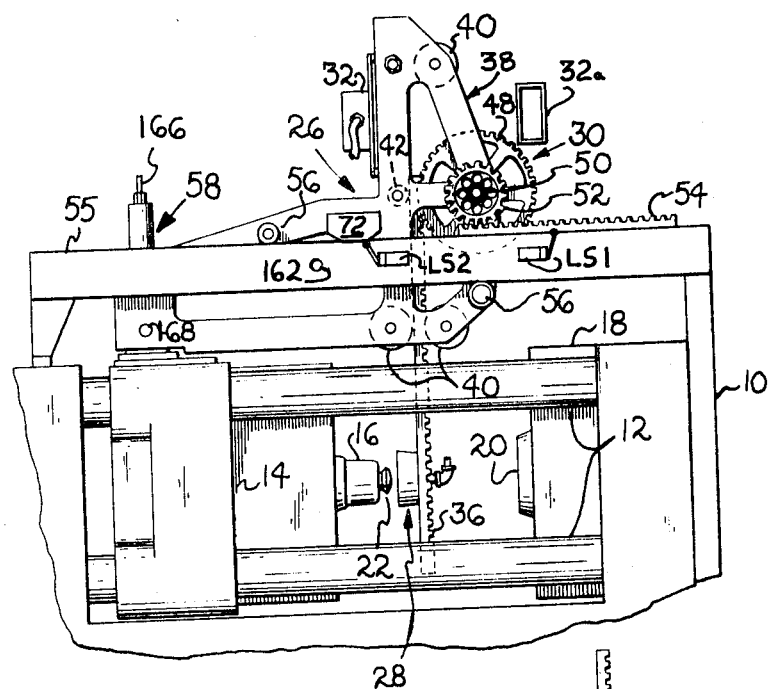
FIGS. 2 and 3 are partial side elevation views of the machine showing the part removal apparatus respectively engaging and removing a part.
Figure 3:
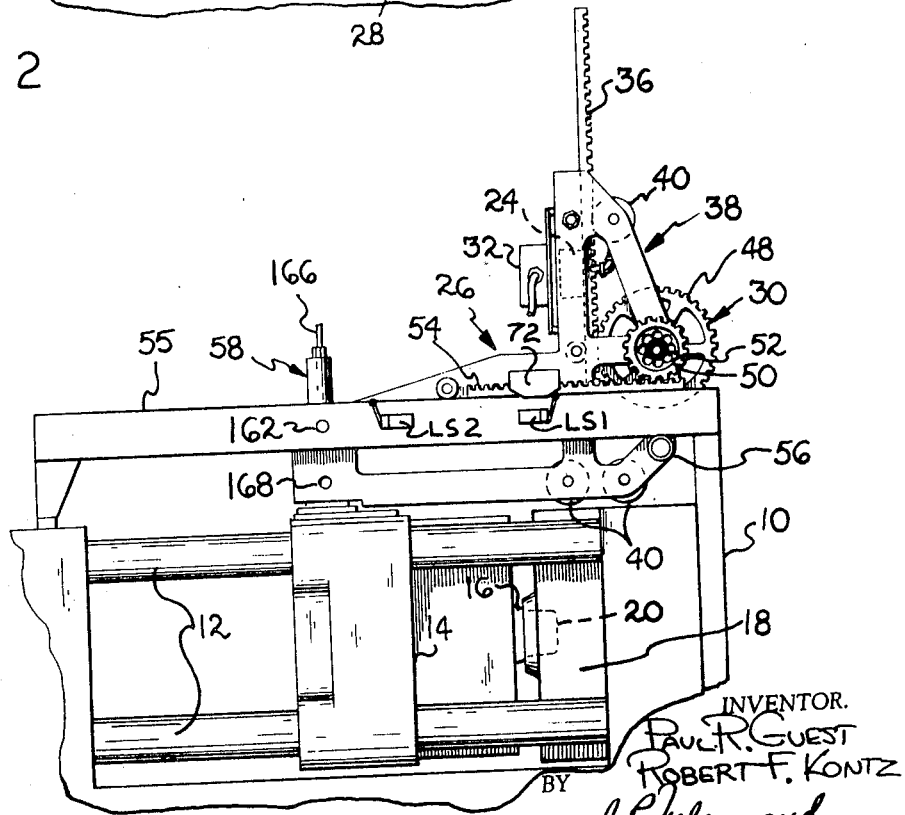

Actuation of solenoids P, V, and C is achieved by an electrical control circuit schematically illustrated in FIG. 5a. All solenoids are normally de-energized and are energized only upon the closure of the appropriate one of limit switches LS1 and LS2. Referring briefly to FIGS. 2 and 3, it is seen that limit switches LS1 and LS2 are mounted on the outer side of carriage guide way 55 with their strikers projecting into the path of movement of an actuating cam 72 which is mounted upon and movable with carriage 38. Cam 72 is located to engage and depress the striker of limit switch LS1, thereby closing the limit switch contact, when the part holding cup 33 is in its upper most or discharge position, aligned with the receiving opening of discharge chute 32. Closure of the contacts of limit switch LS1, referring now to the diagram of FIG. 5a, complete a circuit across electrical supply lines L1 and L2 through the parallel connected solenoids and P and C, and thus energizing the solenoids to supply air under pressure from pressure source PS to cup 33 to discharge chute 32. The supply of air to cup 33 blows a part carried by the cup into discharge chute 32 while the supply of air to the chute in turn blows the part clear of chute 32 into stationary receiving chute 32a.

When part holding cup 33 is in its part receiving position, illustrated in FIG. 2, limit switch actuating cam 72 has engaged and despressed the striker of limit switch LS2. Returning to FIG. 5a, it is seen that closure of limit switch LS2 energizes solenoid V, thereby actuating valve 62 to supply vacuum from vacuum source VS to cup 33.

The configuration of cam 72 is such that the striker of limit switch LS2 is engaged and depressed by the cam before the part holding cup 33 arrives at its lower most part receiving position illustrated in FIG. 2. The striker of limit switch LS2 thus is depressed and maintained in a depressed position until cup 33 has started to move upwardly away from the mold. When cam 72 clears the striker of limit switch LS2, thus enabling its contacts to open, solenoid V is de-energized and valve 62 returns to its neutral position. However, because at this time a vacuum exists and is held by the retained part in cup 33, the part remains in the cup until it arrives at the part discharging position illustrated in FIG. 3. The configuration of cam 72 is such that the striker of limit switch LS1 is depressed only when the cup has arrived at a position in alignment with the part receiving opening in discharge chute 32. Part holding cup 33 normally will remain in the part discharge position shown in FIG. 3 for the period of time required to inject plastic into the now closed mold assembly and for the formation of the plastic articles, hence ample time is provided to transfer the part from cup 33 into chute 32 and in turn to discharge the part from chute 32.

It should be noted that discharge chute 32 is mounted upon and is movable with carriage 38 and hence is in the desired alignment with receiving chute 32a only when the mold is fully closed.

Figure 6:
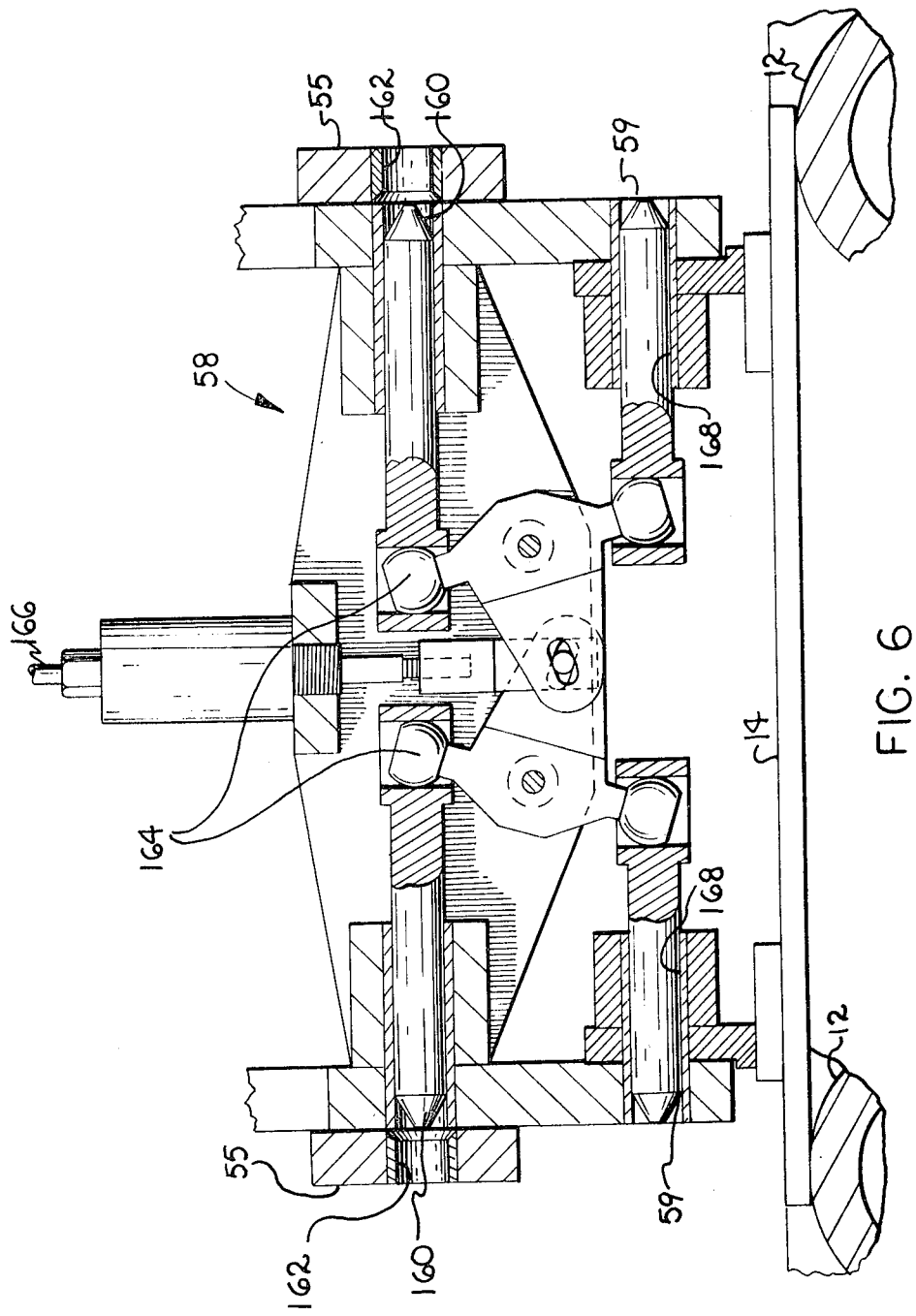
FIG. 6 is a sectional view taken along line 6-6 in FIG. 1 showing interlocking arrangement for the machine and the part removal apparatus.

The carriage 38 is mounted on the movable platen 14 either for movement with the movable platen 14, or movement relative to it when attached to the frame 10. This relative movement is facilitated by the carriage guideways 55, which are engaged by guide rollers 56 on carriage 38 (see FIG. 1). These connections between the carriage 38, the platen 14 and the frame 10 are made by an oppositely acting pin device, denoted generally by the numeral 58. As illustrated in FIG. 6, the pin device 58 is mounted on and secured to the movable platen 14 and includes two carriage engaging pins 59 and two frame engaging pins 160, which engage openings 162 in the carriage guideway 55. The device 58 employs socket members 164, which are pivoted about their axes by an actuator 166, so in the illustrated position the carrier engaging pins 59 engage openings 168 in carriage 38 and thus connect carriage 38 to the movable platen 14, whereas the frame engaging pins 160 are out of engagement with the guideway openings 162. Consequently, carriage 38 will move back and forth with the movable platen 14. If now the actuator 166 is pulled upwardly to pivot the socket members 164 about their axes, the carriage engaging pins 59 will be withdrawn from the opening 168 and the frame engaging pins 160 will be moved into engagement with the openings 162. This permits the machine to be operated in whatever way desired without the part removal apparatus 26 being moved and becoming operative. The device 58 particularly facilitates the cleaning and the servicing of the machine.

Briefly summarizing now the operation: Assuming that the pin device 58 is operated by the actuator 166 so as to connect carriage 38 to the movable platen 14 and that the movable platen 14 has been moved into engagement with the fixed platen 18, the part removal apparatus 26 will then be in the FIG. 3 position with the driven racks 36 in their uppermost position and carriage 38 in its rightmost position. Also, it will be assumed that the plastic-like material has been ejected by the nozzle 22 and a part 24 formed. To commence a cycle of operation, the movable platen 14 will now be separated from the fixed platen 18 and as this movement occurs, carriage 38 will be moved with the movable platen 14 leftwardly so that the small gears 52 will be revolved counterclockwise due to the movement of the carrier 38 relative to the fixed drive racks 54. The large gears 48, will also revolve counterclockwise and, in turn, move the driven racks 36 downwardly to the FIG. 2 position. In this FIG. 2 position and also as displayed in FIG. 5, the holder 33 will grasp the part 24, due to the suction from the vacuum source VS at this point, as described above, carriage 38 will reverse direction as the movable platen 14 is returned to the FIG. 3 position to commence the forming of another part. Consequently, the rotation of the gears 48 and 52 will be reversed and the driven racks 36 will be moved upwardly to the FIG. 3 position. This will move the holder 33 and the part 24 to the uppermost position of the driven racks 36 and opposite the discharge chute 32.

Pressure is now supplied to the holder as described above to eject the part 24 into discharge chute 32 which in turn blows the part into the aligned receiving chute 32a in an oriented position. This cycle of operation is repeated with the carrier 38 being moved back and forth to transfer the parts 24 from the mold to receiving chute 32a in synchronism with the movements of the movable platen 14.

What is claimed is:

1. Part removal apparatus for removing and discharging formed parts from a machine having a frame, pair of platens mounted on said frame for movement relative to each other, and means for moving said platens relative to each other between an open and a closed part forming position, the formed part being retained upon one of said platens upon opening of the platens; said apparatus comprising a carriage mounted upon said one of said platens, a part discharge chute fixedly mounted on said carriage, a part holder mounted on said carriage for movement between a part discharge position adjacent said chute and a part pick up position adjacent that portion of said one of said platens upon which the part is retained on opening of said platens, means coupled between said carriage and the other of said platens for driving said part holder to said pick up position upon opening of said platens and for driving said part holder to said discharge position upon closing of said platens, a part receiving chute located to be operatively aligned with said part discharge chute when said platens are closed, a pressure source, a vacuum source, first control means operable when said part holder is adjacent said pick up position for operatively connecting said vacuum source to said holder to cause said holder to grip and retain a part upon said holder, second control means operable upon the arrival of said holder at said discharge position for operatively connecting said pressure source to said holder to blow a part from said holder into said discharge chute, and pneumatic means for transferring a part from said discharge chute to said receiving chute while the platens are in their closed position.

2. Apparatus as defined in claim 1 wherein said receiving chute is mounted at a stationary location, said one of said platens and said carriage being movable to a position where said discharge chute is aligned with said receiving chute only when said platens are closed.

3. Apparatus as defined in claim 1 wherein the other of said platens is fixed to said frame, and means for selectively locking said carriage to said frame or to said one of said platens for movement therewith.

4. Part removal apparatus for removing and discharging formed parts from a machine having a frame, a first platen fixed to said frame, a second platen mounted on said frame for movement toward and away from said first platen between an open position and a closed part forming position, the formed part being retained on said second platen upon movement of said second platen to said open position; said apparatus comprising a part receiving chute mounted upon said frame, a part discharge chute mounted on said second platen for movement therewith to be located in an inoperative position out of alignment with said receiving chute when said platens are open and in an operative part transfer position in alignment with said receiving chute when said platens are closed, a part holder mounted on said second platen for movement between a part receiving position adjacent a formed part retained on said second platen and a part discharge position in alignment with said discharge chute, drive means coupled between said frame and said part holder to locate said part holder in said receiving position when said platens are open and in said discharge position when said platens are closed, first means operable when said platens are open to transfer the retained part from second platen to said holder, and second means operable when said platens are closed to transfer the part from said holder to said receiving chute via said discharge chute.

5. Part removal apparatus as defined in claim 4 wherein said first means comprises means for applying a vacuum to said holder, and said second means comprises means for supplying air under pressure to said holder to blow said part into said discharge chute and for supplying air under pressure to said discharge chute to blow said part into said receiving chute.

* * * * *